United States Patent [19]

Palmer

[11] Patent Number: 4,633,969

[45] Date of Patent: Jan. 6, 1987

[54] SIGNALLING DEVICE

[76] Inventor: Malcolm G. Palmer, 12 Forge Lane, Blakedown, Kidderminster, Worcestershire, United Kingdom

[21] Appl. No.: 648,169

[22] PCT Filed: Dec. 22, 1983

[86] PCT No.: PCT/GB83/00341

§ 371 Date: Aug. 30, 1984

§ 102(e) Date: Aug. 30, 1984

[87] PCT Pub. No.: WO84/02788

PCT Pub. Date: Jul. 19, 1984

[30] Foreign Application Priority Data

Jan. 12, 1983 [GB] United Kingdom ................. 8300709

[51] Int. Cl.[4] .......................... G01V 1/06; G01V 1/38

[52] U.S. Cl. .................................... 181/118; 181/402; 367/145

[58] Field of Search ............... 181/113, 116, 117, 118, 181/142, 402; 367/144, 145, 146, 147, 131; 102/390, 392, 416

[56] References Cited

U.S. PATENT DOCUMENTS

| | | | |
|---|---|---|---|
| 2,601,245 | 6/1952 | Bowersett | 181/142 |
| 2,859,695 | 11/1958 | Rolle | 116/211 |
| 3,039,559 | 6/1962 | Ellsworth | 181/142 |
| 3,128,704 | 4/1964 | Noddin et al. | 102/223 |
| 3,532,057 | 10/1970 | Aubrey | 102/229 |
| 4,202,425 | 5/1980 | Hambrick, Sr. et al. | 181/120 |
| 4,311,097 | 1/1982 | Backstein et al. | 102/229 |
| 4,487,126 | 12/1984 | Schaper | 102/229 |
| 4,514,834 | 4/1985 | Hanson et al. | 367/141 |

FOREIGN PATENT DOCUMENTS 350898 1/1961 Switzerland .

*Primary Examiner*—John F. Terapane
*Assistant Examiner*—Eric Jorgensen
*Attorney, Agent, or Firm*—Cushman, Darby & Cushman

[57] ABSTRACT

A device for under-water signalling has a chamber (38) which is normally closed by a replaceable element (39). A cartridge (16) in the device can be fired to release gas into the chamber and rupture the element (39), thus causing a sound wave to travel through the water and releasing the contents of the chamber into the water. When an end cap (13) has been removed to prepare the device for use, water pressure can act on a piston (23) to cause firing of the cartridge.

8 Claims, 1 Drawing Figure

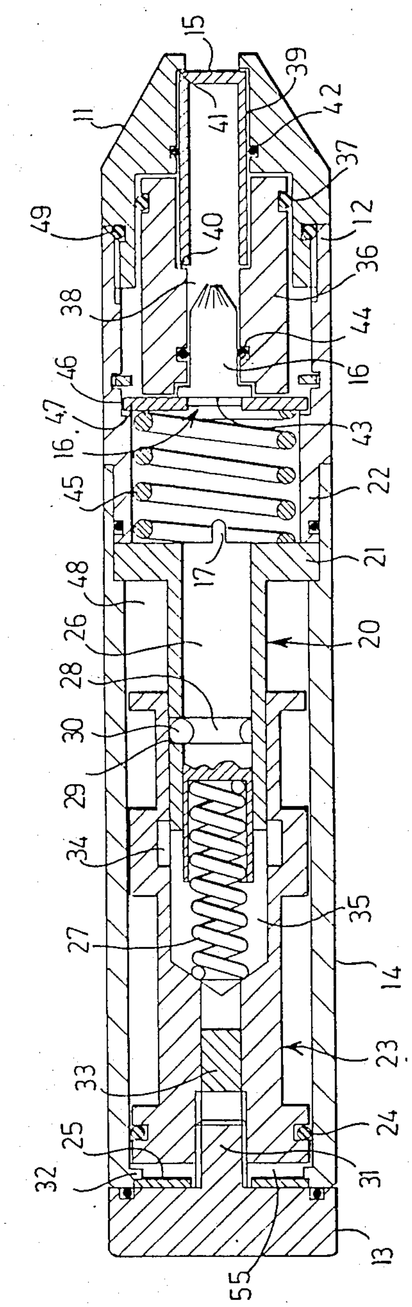
15
39
42
41
11
37
12
49
40
36
38
44
46
16
4,7
16
43
45
22
17
21
48
26
20
28
30
29
34
35
27
14
23
33
24
25
32
31
13
55

SIGNALLING DEVICE

BACKGROUND OF THE INVENTION

The present invention relates to signalling and is primarily concerned with signalling between persons, at least one of whom is submerged in a body of water. One object of the invention is to provide a signalling device which is less elaborate than are known devices for underwater communication.

SUMMARY OF THE INVENTION

According to a first aspect of the invention, there is provided a signalling device comprising a hollow body within which there is a chamber, a closure element which normally closes the chamber off from a space outside the body, a source of gas adapted to charge the chamber with gas, whereby the pressure within the chamber can be increased to rupture the closure element, and triggering means for initiating release of gas from said source into the chamber, the closure element being adapted to be ruptured by a gas pressure within the chamber which the body can withstand without rupture.

If the outer face of the closure element is in contact with a body of water, rupture of the closure element by gas pressure within the chamber causes a sound wave to be transmitted through the water. Furthermore, rupturing of the closure element may release into the water from the chamber material which is adapted to provide a signal, for example a visual signal.

According to a second aspect of the invention, there is provided a method of signalling wherein a body of a signalling device is opened, an ambient pressure substantially above atmospheric pressure at sea level is exerted on an element within the body, said ambient pressure causes release of gas into a chamber in the body and the gas pressure within the chamber ruptures a closure element closing the chamber off from a space outside the body.

The body preferably includes first and second parts adapted to be released from each other and to be reassembled with each other by manipulation of the body parts and the closure element is preferably trapped between said parts. With this arrangement, the closure element can easily be replaced by a fresh closure element, during preparation of the device for reuse.

The source of gas is conveniently a cartridge comprising a combustible propellent and a percussion cap for igniting the propellent.

BRIEF DESCRIPTION OF THE DRAWING

An example of a signalling device embodying the first aspect of the invention and which can be used in a method according to the second aspect of the invention will now be described, with reference to the accompanying drawing, which shows a cross-section of the device.

DETAILED DESCRIPTION OF THE PREFERRED EMBODIMENT

The device shown in the drawing comprises a body which includes a housing of generally cylindrical shape which is formed in four parts, namely a first end cap 11, a shorter tubular part 12 on which the first end cap is fitted, a second end cap 13 and a longer tubular part 14, on which the second end cap is fitted, the tubular parts 12 and 14 being connected to one another in coaxial relation by a spigot and socket joint. The first end cap 11 defines an opening 15 to the interior of the body, is screwed into the housing part 12 and is sealed thereto by an O-ring seal 49.

The joint between the housing parts 12 and 14 is provided for convenience in manufacture and assembly of the device only. These housing parts may be permanently secured together.

Within the shorter housing part 12, there is disposed a source 16 of gas under pressure and within the longer housing part 14 there is disposed triggering means for initiating release of gas from the source. There is also disposed within the longer housing part a sleeve 20 having at one end a flange 21 which is a sliding fit within the housing part 14 and bears against an abutment constituted by a spigot 22 of the shorter tubular part 12 which extends into the longer tubular part 14. This spigot is provided with an O-ring seal to prevent ingress of water at the joint between the housing parts 12 and 14.

The sleeve 20 extends from the flange 21 in a direction away from the first end cap 11 into a driving element constituted by a hollow body 23. This body is a sliding fit within the longer tubular part 14 of the housing and is adapted to act as a piston within the housing, being provided with an O-ring 24 which forms a sliding seal with the internal surface of the housing part 14. There is also disposed within the housing part 14, at a position adjacent to the second end cap 13, a cover 25 which is fixed with respect to the housing, is formed with a central aperture and covers an annular surface of the body 23 which is presented towards the end cap 13.

The end cap 13 is provided with an O-ring seal and is secured on the housing part 14 at the end thereof remote from the shorter housing part 12 to close the opening 55 defined by the housing part 14 and partly occupied by the cover 25. When the end caps are both in position on the tubular parts of the housing and prior to use of the device, the housing is completely sealed against ingress of water. The components of the housing are conveniently formed of a plastics material which will not deteriorate when exposed to moisture.

Within the sleeve 20, there is mounted a striker 26 which is massive relative to the body 23 and relative to the sleeve. The striker may be constructed of a solid piece of metal; whereas the sleeve 20 and body 23 are preferably formed of a plastics material. The striker is of generally cylindrical form and has at one end a nose 17. In an end of the striker remote from the nose, there is provided a socket in which there is received an end portion of a resilient operating means in the form of a coiled compression spring 27. An opposite end of the spring bears against a seal provided in the body 23.

An annular groove 28 is formed in the circumferential surface of the striker 26 and, prior to use of the device, this groove is aligned with an aperture 29 in the sleeve 20. In this aperture, there is disposed a retaining element in the form of a ball 30. The ball is normally constrained by the internal surface of the body 23 to occupy a position in which it projects into the groove 28. The ball 30 and sleeve 20 thus constitute holding means for holding the striker 26 releasably in a position in which the striker is spaced from the source of gas 16.

The second end cap 13 is held in the position shown in the drawing by means of a screw-threaded spigot 31 on the end cap which extends into threaded engagement with the body 23. The body 23 is thus retained in a position adjacent to the end cap 13 with the cover 25 and a lip 32 on the housing part 14 being trapped between the body 23 and the end cap 13. In the event of the device being dropped inadvertently, movement of the body 23 along the housing is prevented by the end cap 13 and movement of the sleeve 20 along the housing is prevented by the spigot 22 so that there is no risk of the striker 26 moving towards the source of gas 16.

The body 23 can be freed for movement along the housing 10 by screwing the spigot 31 out of the body 23. The device is thereby prepared for use. If the device is then thrown into water, it will sink and water will enter the housing through the aperture in the cover 25. The ambient pressure will thus be exerted by the water on an end face of the body 23 and will tend to move that body along the housing towards the end cap 11. Flow of water through the body 23 along a central passage defined thereby is prevented by a plug 33 formed of material which is impermeable to water and which is disposed in the passage of the body.

If the device, with the end cap 13 removed, is permitted to sink rapidly in water to a predetermined depth, for example 35 feet, the device is operated. The pressure exerted by the water on the body 23 moves the body towards the end cap 13 against the action of the spring 27 and compresses the spring between the body 23 and the striker 26. In the radially inwardly facing surface of the hollow body 23, there is formed an annular recess 34 which moves into alignment with the aperture 29 when the body approaches the flange 21. The recess 34 is sufficiently large to permit the ball 30 to move out of the groove 28 in the striker when the ball is aligned with the recess 34. The sides of the groove 28 are inclined to a longitudinal axis of the device to ensure that the ball 30 will be moved away from that axis by a camming action and into the recess 34. In this way, the striker 26 is released for movement along the axis relative to the sleeve 20 and is propelled by the spring 27 towards the source of gas 16.

A body of air which is trapped within the housing 10 constitutes a further operating means for exerting on the striker 26 a force which urges the striker towards the percussion cap 17. This body of air is compressed by movement of the body 23 along the housing under the influence of externally applied pressure. The body of air occupies at least the space 35 between respective seats provided on the body 23 and on the striker 26 for engagement by the spring 27.

In a case where the force exerted on the striker 26 at the moment when the striker is released for movement towards source of gas 16 is required to be determined by the spring 27, communication is provided between the air space 35 and further air spaces around the periphery of the body 23, between the striker and source of gas 16 and around the sleeve 20. The total volume of these spaces is large, as compared with the reduction in the volume available to be occupied by the air contained in these spaces when the body 23 is moved along the housing sufficiently to release the striker. Accordingly, only a small increase in the pressure of air contained in these spaces occurs. Alternatively, the air which is trapped within the housing 10 and is compressed by movement of the body 23 along the housing may be required to exert a significant force on the striker 26 for urging that striker towards the source of gas. In this case, the further air spaces may be omitted, or the air space 35 may be sealed from these further air spaces. There may be provided between the external surface of the sleeve and the internal surface of the body 23 sufficient clearance to permit air to flow to the space 35 from the space 48 which lies outside the sleeve 20 and into which the body 23 moves when that body is moved along the housing. A sliding seal may be interposed between the body 23 and the housing part 14 adjacent to the air space 48. In certain embodiments of the invention, the spring 27 may be omitted, air trapped in the air space 35 and in any communicating air space constituting the sole operating means for exerting force on the striker.

It will be noted that the device has no electrical circuit and therefore cannot be affected by extraneous electro-magnetic signals. The absence of a battery avoids one cause of unreliability in electrically operated signalling devices which are stored for a significant period.

The body of the device further includes a robust hollow cylinder 36 disposed partly within the end cap 11 and partly within the shorter housing part 12. This cylinder is preferably formed of a metal which does not readily corrode, for example brass. An O-ring seal 37 is provided between the external surface of the cylinder 36 and the internal surface of the end cap 11.

The cylinder 36 and the end cap 11 collectively define a cylindrical chamber 38 which normally contains air at atmospheric pressure and which is closed off from the space outside the device by a closure element 39. The closure element is trapped between respective opposed shoulders 40 and 41 on the cylinder and on the end cap 11. In the particular example illustrated, these shoulders are spaced a considerable distance apart and the closure element has the form of a tube with one closed end immediately adjacent to the opening 15 and one open end facing towards the source 16 of gas. The interface between the end cap 11 and the closure element 39 is sealed by an O-ring seal 42.

The source of gas 16 is disposed in an end portion of the chamber 38 remote from the end cap 11 and is adapted to release gas into the chamber when struck by the nose 17 of the striker 26. The source 16 may be in the form of a cartridge containing compressed gas. Alternatively, the source may be in the form of a cartridge containing a mixture or chemical compound which reacts to produce a gas. The preferred source of gas is a known blank cartridge having a percussion cap 43 and a charge of combustible propellent. The cartridge is fitted into an end portion of the cylinder 39 with a lip on a cap of the cartridge seating in an annular recess in an end face of the cylinder. An O-ring seal 44 is provided at the interface between the cartridge and the cylinder.

For maintaining the cartridge 16 firmly seated on the cylinder 39, there is provided a resilient element 45 which acts, in effect, between the housing 10 and an annular plate 46 which overlaps the end face of the cartridge adjacent to the percussion cap 43, the percussion cap being accessible to the nose 17 through a central opening defined by the plate 46. The plate 46 is trapped between an end face of the cylinder 39 and a shoulder 47 on the shorter housing part 12. In the particular example illustrated, the element 45 is a coiled compression spring seated on the plate 46 and on the flange 21.

It will be seen that the spring 27 is not subjected to stress prior to use of the device. Thus, failure of any components of the device during storage is unlikely to lead to discharge of gas from the cartridge 16. The device may be carried by a person under water without the device being operated. That person can operate the device simply by removing the end cap 13. alternatively, the device can be used by removing the end cap 13 and then lowering the device into a body of water. In either case, water enters the body of the device through the opening in the cover 25 and acts on the piston body 23 to compress the spring 27. The device can be adapted to operate whenever the body 23 is subjected to any selected pressure which is significantly greater than atmospheric pressure at sea level.

When water at the predetermined pressure is admitted to the body, the striker 26 is projected towards the cartridge 16 so that the nose 17 strikes the percussion cap 43. The propellent in the cartridge is ignited and reacts to release gas into the chamber 38 and to establish in that chamber a pressure such that the closure element 39 ruptures. This closure element is adapted to be ruptured by a pressure within the chamber 38 which is insufficient to rupture the body of the device. Rupture of the closure element 39 causes a sound wave to be transmitted through the water and also releases the contents of the chamber 38 into the water. A dye or other signalling medium may be provided in the chamber 38 so that this signalling medium will be released into the water when the closure element ruptures. The minimum pressure within the chamber 38 which ruptures the closure element 39 is considerably less than the minimum pressure in the chamber 38 which would permanently affect the housing 10 and other components. Accordingly, rupturing of the closure element 39 prevents other parts of the device being damaged by an increase in the pressure in the chamber 38.

There is normally a small clearance between the plate 46 and the shoulder 47. Movement of the plate towards the shoulder is opposed by the spring 45. When combustion of the propellent in the cartridge 16 occurs, the recoil action of the cartridge is attenuated by movement of the plate 46 against the spring so that the shock transmitted to the housing 10 when the plate engages the shoulder 47 is less severe than would be the case if there were no clearance between the plate 46 and the shoulder 47. We have found that the cartridge remains impermeable to water and remains sealed to the cylinder 39, so that water is not permitted to enter parts of the device other than the chamber 38 when the closure element 39 is ruptured.

The device can be prepared for re-use by unscrewing the end cap 11 from the body part 12 and then withdrawing the cylinder 36 and the spent cartridge 16 from the body. The spent cartridge is removed from the cylinder and a fresh cartridge is inserted into the cylinder. The ruptured closure element is removed from the end cap 11 and a fresh closure element is inserted into the end cap. The cylinder 36 is then placed over the protruding part of the closure element and the assembly of end cap 11, cylinder 36, cartridge 16 and closure element 39 is applied to the remainder of the device, the end cap being screwed into the body part 12 until the O-ring 49 is compressed. During movement of the end cap into the body part, the spring 45 is compressed.

It will be seen that the device can be prepared for re-use by manipulation of the parts and tools are not required. The O-rings of the device are preferably coated with a silicone grease to facilitate assembly of the components. The triggering means is cocked by forcing the striker 26 along the sleeve 20 in a direction away from the body part 12 until the ball 30 can drop into the groove 29 in the striker. This frees the body 23 for movement under the action of the spring 27 to the position illustrated in the drawing.

The closure element 39 is preferably formed of a plastics material. A suitable closure element is formed of polyethylene and has a wall thickness, both peripheral wall and end wall, in the region of 1.5 mm. It will be noted that considerably less than one half the volume of the chamber 38 is occupied by the cartridge 16 and that the volume of the air space in the chamber is considerably greater than the volume of the cartridge.

It will also be noted that a part of the length of the closure element 39 lies within the cylinder 36 and a further, approximately equal part of that length lies in the end cap 11. It will also be noted that the external periphery of the cylinder 36 engages only with the O-ring 37.

Whilst the opening 15 is conveniently positioned at one end of the device, it may alternatively be positioned at a side of the device. In this case, the closure element would be a somewhat shorter tube than that illustrated or may be a disc.

The cover 25 is permanently secured on the body part 14 and has a central opening of fairly small diameter which restricts access to the body 23, even when the end cap 13 has been removed. Thus, a user cannot insert a finger through the cover to exert force on the body 23. Access through the opening 25 to the body 23 may be further obstructed, provided water can enter the device to act on the body 23.

The invention disclosed herein has diverse forms, not limited to the subject matter of the following claims and means for carrying into effect the specific features disclosed in the foregoing description, in the following claims and/or in the accompanying drawings may, both separately and in any combination thereof, be material for realising the invention.

What is claimed is:

1. A signalling device comprising:

a hollow body within which there is a chamber, a closure element which normally closes the chamber off from space outside the hollow body, a source of gas adapted to charge the chamber with gas, whereby the pressure within the chamber is increased to rupture the closure element, and triggering means for initiating release of gas from said source into the chamber, wherein the hollow body includes first and second parts provided with respective threads which are mutually engaged to hold the parts releasably together, said first and second body parts having respective annular shoulders facing in respective directions along the threads towards each other, both shoulders being engaged with the closure element to trap the closure element between the shoulders, said closure element being adapted to be ruptured by a gas pressure within the chamber which gas pressure the hollow body can withstand without rupture.

2. A device according to claim 1 wherein the triggering means is adapted to initiate release of gas into the chamber when the device is subjected to a predetermined ambient pressure.

3. A device according to claim 1 wherein the source of gas is a mixture or chemical compound which reacts to produce the gas.

4. A device according to claim 1 further comprising:

a sealing element mounted in the hollow body at a position between said annular shoulders and engaged with the closure element to seal the closure element to one of said first and second parts against ingress of water.

5. A signalling device comprising:

a hollow body within which there is a chamber, a closure element which normally closes the chamber off from space outside the body, a source of gas which is a cartridge including a propellent and a percussion cap means for igniting the propellent to charge the chamber with gas, whereby the pressure within the chamber is increased to rupture the closure element, and triggering means for striking the percussion cap means to initiate the generation of gas from said propellent, wherein the closure element is adapted to be ruptured by a gas pressure within the chamber which the hollow body can withstand without rupture.

6. A signalling device comprising:

a hollow body within which there is a chamber, a closure element which normally closes the chamber off from space outside the hollow body, a source of gas adapted to charge the chamber with gas, where the pressure within the chamber is increased to rupture the closure element, and triggering means for initiating release of gas from said source into the chamber, wherein the hollow body includes a housing part and a removable end cap fitted on the housing part, said housing part and said end cap having respective shoulders facing towards each other and both being engaged with the closure element, said closure element being trapped between said shoulders, and wherein the closure element is adapted to be ruptured by a gas pressure within the chamber which the body can withstand without rupture.

7. A device according to claim 6 further comprising:

a second removable end cap which closes an opening to the interior of the hollow body and which second removable end cap can be removed to admit ambient pressure to the interior of the hollow body.

8. A signalling device comprising:

a hollow body within which there is a chamber, a closure element which normally closes the chamber off from space outside the hollow body, a source of gas adapted to charge the chamber with gas, whereby the pressure within the chamber is increased to rupture the closure element, and triggering means for initiating release of gas from said source into the chamber, wherein the hollow body includes first and second separable body parts, said first body part being a cylinder and having means for guiding the second body part along an axis of the cylinder into and out of assembled relationship with said first body part and for releasably retaining the second body part in assembled relationship with the first body part, wherein the first and second body parts have respective shoulders facing towards each other, wherein the closure element is trapped between said shoulders, and wherein the closure element is adapted to be ruptured by a gas pressure within the chamber which gas pressure the hollow body can withstand without rupture.

* * * * *